B. H. THOMPSON.
ELECTRIC RAIL BOND.
APPLICATION FILED MAR. 8, 1913.

1,098,192.

Patented May 26, 1914.

WITNESSES
R. S. Harrington
Geo. B. Messer

Bartlett H. Thompson
INVENTOR
By E. S. Duvall Jr.
his Attorney

UNITED STATES PATENT OFFICE.

BARTLETT H. THOMPSON, OF NORTH ADAMS, MASSACHUSETTS, ASSIGNOR OF ONE-HALF TO GEORGE WALLACE, OF WILLIAMSTOWN, MASSACHUSETTS.

ELECTRIC RAIL-BOND.

1,098,192. Specification of Letters Patent. Patented May 26, 1914.

Application filed March 8, 1913. Serial No. 752,914.

*To all whom it may concern:*

Be it known that I, BARTLETT H. THOMPSON, a citizen of the United States, residing at North Adams, in the county of Berkshire and State of Massachusetts, have invented new and useful Improvements in Electric Rail-Bonds, of which the following is a specification.

My invention relates to electric rail bonds and consists of a conducting device adapted to be located within recesses or cavities formed in the tread portion of the rails where they are joined together, the device being constructed so as to be maintained in operative relation with the rails under the varying conditions of contraction and expansion.

One of the objects accomplished by the invention is to locate the bonding device inside of the rail joint so as to afford protection against its destruction or derangement.

Another object is to provide compensating means to permit contraction and expansion of the bond commensurate with the contraction and expansion of the rails, which increases or decreases the space at the joint. This self-adjusting feature of the bond is highly desirable.

Other objects and advantages will become apparent from the description to follow.

Figure 1:
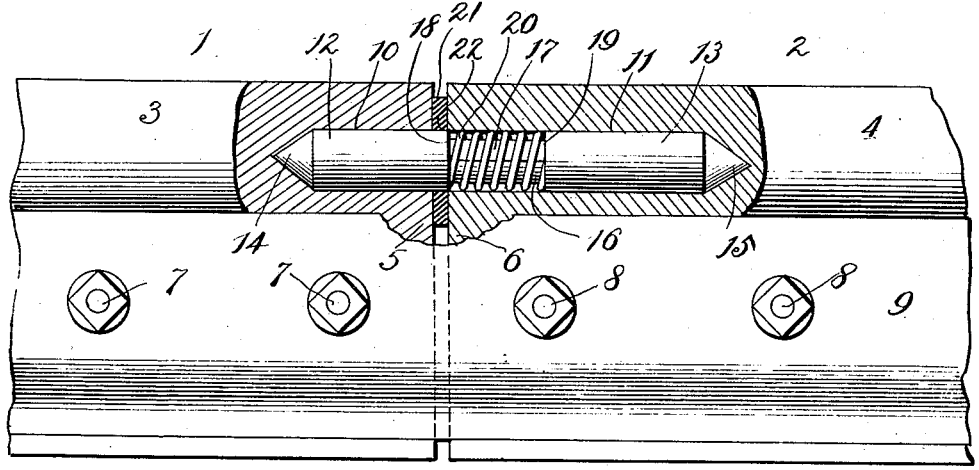
Figure 2:
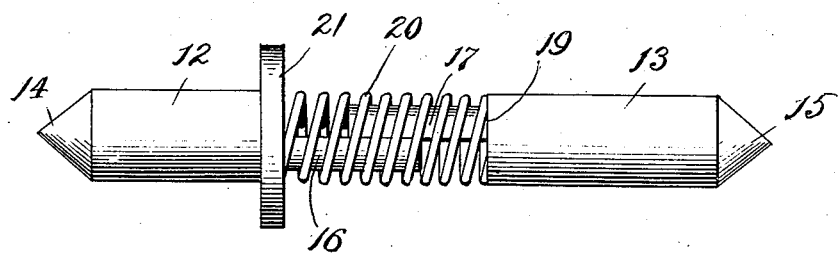
Figure 3:
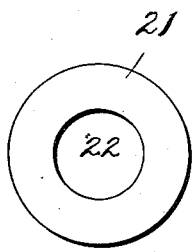

In the accompanying drawing, illustrating the invention, Figure 1, is a side elevation of the parts of two rails where joined together, portions of each being broken away and shown in section to clearly illustrate the invention; Fig. 2, is a plan view of the bonding device and Fig. 3, is a detailed view of the insulating ring or washer which forms a part of the device.

In the drawing, like numerals of reference designate like parts.

1 and 2 designate the adjoining rails which are provided with the usual tread portions 3 and 4. The body portions 5 and 6 are provided with the usual bolt openings for the reception of the bolts 7, 7 and 8, 8 which secure the fish-plates 9, to connect the rails at the joint.

The tread portions are provided with the cylindrical recesses 10 and 11 arranged longitudinally and centered one with the other. The recess 11 is made of greater depth than the other recess for a purpose which will become apparent from the description of construction which follows. The interior ends of these recesses are conical-shaped. Seated in these centered recesses and made of slightly less diameter so as to work freely therein, are the cylindrical pins or bolts 12 and 13, made of any suitable conducting material. The pin 13 which is located in recess 11, is correspondingly longer than the other pin. Said pins are formed with conical-shaped ends 14 and 15 and for a suitable distance longitudinally their other ends, which adjoin, are reduced to form semi-cylindrical portions 16 and 17. These portions are slightly less in diameter than the major portions of the pins and by this construction, are formed circumferential shoulders 18 and 19, on the pins, approximately an equal distance from the said adjoining ends. These shoulders are formed to retain a spiral spring 20, of substantially the same diameter as the major portions of the pins, which spring is made of any suitable conducting material. The reduced portions 16 and 17 are inclosed by the said spring and the flat surfaces of the said portions are arranged contiguously so as to slide longitudinally one against the other, under tension of the spring, when the adjacent rail ends are caused to be moved by contraction. The action of the spring always holds the conical ends of the pins in contact with their conical seats at the interior ends of the recesses.

A ring or washer 21 of any suitable nonconducting material such as rubber or gutta-percha is provided with a central opening 22 of sufficient diameter to permit the insertion of the pin 12. When the above described bonding device is in place, this insulating ring or washer, carried by the pin 12, is positioned between the contiguous ends of the rail.

Having thus fully described my invention, what I claim as new and desire to secure by Letters Patent is:

1. The combination with rails having concentric, longitudinal recesses formed in their adjacent ends, of a bond for electrically connecting said rails, comprising a split conductor confined within the recesses and in contact with the rails, and means acting automatically for moving the sections of the conductor, one with each of the rails, when the latter are moved by force of contraction.

2. The combination with rails having concentric, longitudinal recesses formed in their adjacent ends, of a bond for electrically connecting said rails, comprising coacting pins of suitable conducting material, having slidable contact with one another, and positioned in said recesses in contact with the rails and means acting automatically, when the rails contract, for moving the said pins in relatively opposite directions and for maintaining the said contact.

3. The combination with rails having concentric, longitudinal recesses formed in their adjacent ends, of a bond for electrically connecting said rails, comprising pins of suitable conducting material, having slidable contact with one another and positioned in said recesses in contact with the rails and an expansible spring of conducting material in engagement with and operating upon the two pins to move the same in relatively opposite directions, when the rails contract, and to maintain the said contact.

4. The combination with rails having concentric, longitudinal recesses formed in their adjacent ends, of a bond for electrically connecting said rails, comprising pins of suitable conducting material, having slidable contact with one another and positioned in said recesses in contact with the rails, an expansible spring of conducting material in engagement with and, operating upon the pins to move the same in relatively opposite directions, when the rails contract, and to maintain the said contact; and a ring or washer of non-conducting material carried by one of said pins and interposed between the said rail-ends.

5. The combination with rails having concentric, longitudinal recesses formed in their adjacent ends, of a bond for electrically connecting said rails, comprising pins of suitable conducting material, positioned in said recesses in contact with the rails, said pins being constructed with reduced semi-cylindrical portions forming shoulders and having slidable contact with one another; a coiled spring of conducting material surrounding said reduced portions and retained in place by said shoulders, said spring operating upon the pins to move the same in relatively opposite directions when the rails contract, and to maintain the said contact; and a ring or washer of non-conducting material carried by one of said pins and interposed between the said rail-ends.

In testimony whereof I affix my signature in presence of two witnesses.

BARTLETT H. THOMPSON.

Witnesses:
WILLIAM O'BRIEN,
JESSIE B. KERR.